Dec. 7, 1965     A. HUREWITZ     3,221,979
TRANSPARENT CONTAINER
Filed March 4, 1963
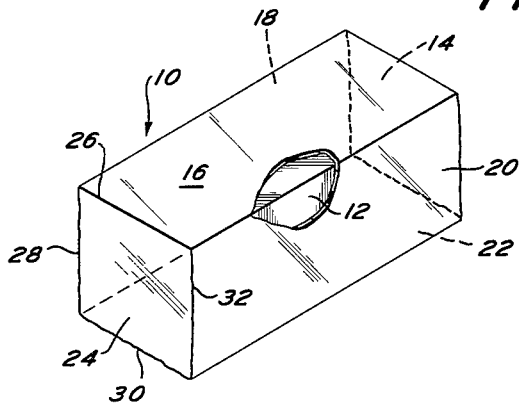
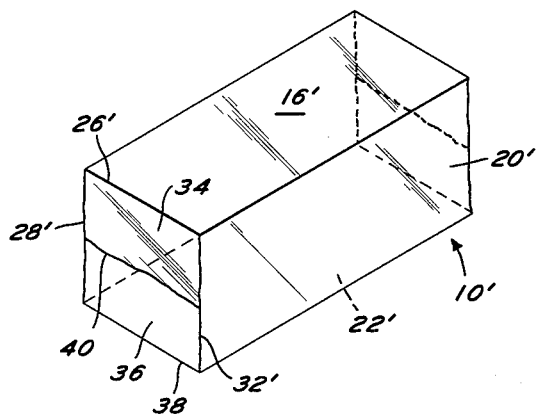
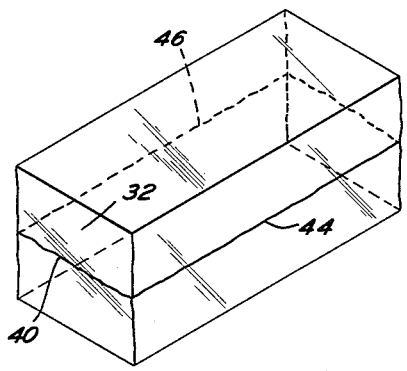
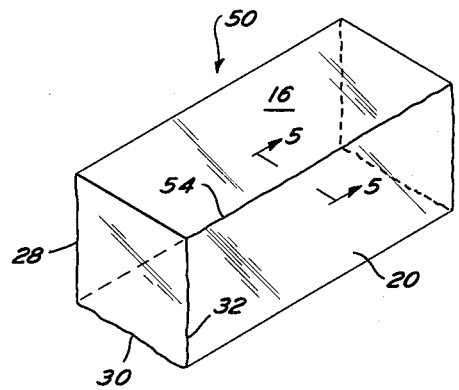
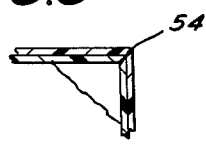
INVENTOR.
ARTHUR HUREWITZ
BY *Arthur H. Seidel*
ATTORNEY United States Patent Office 3,221,979
Patented Dec. 7, 1965

3,221,979
TRANSPARENT CONTAINER
Arthur Hurewitz, Philadelphia, Pa., assignor to Avram G. Adler and Samuel H. Landy, Philadelphia, Pa.
Filed Mar. 4, 1963, Ser. No. 262,430
6 Claims. (Cl. 229—57)

This invention relates to a package, and more particularly, to a package or container made from a heat sealable polymeric thermoplastic material.

The package of the present invention, which may assume a wide variety of shapes, is of the type providing a neat appearance, provides for little or no relative movement between the object and the container, the container may be made from a transparent material capable of being heat sealed, and only one layer of the polymeric material will be juxtaposed to any single face of the object. The apparatus and method for packaging objects is set forth in greater detail in my copending application filed on even date and entitled "Apparatus and Method for Packaging Objects." The disclosure in said copending application is incorporated herein by reference.

The container of the present invention may initially be a seamless tube, two separate sheets, or a single sheet of heat sealable polymeric material. The object disposed within the container may be a dummy to facilitate manufacture of the container or may be the object which is ultimately packaged within the container with the container being sealed at each end thereof. In the latter arrangement, a tear string or the like will be provided to facilitate opening the package when desired. The provision of a tear string or tab, per se, forms no part of the present invention and need not be described in detail.

In each embodiment of the present invention, the container will have spaced parallel heat sealed joints on opposite sides of an end panel and is particularly adapted for use wherein the container is of the type having an end panel which is substantially perpendicular to the body portion of the container. The resultant container will be waterproof and the thermofused joint will be between fifty percent (50%) and one hundred percent (100%) as strong as the material utilized to form the container.

It is an object of the present invention to provide a novel package.

It is another object of the present invention to provide a novel container.

It is another object of the present invention to provide a novel transparent polymeric thermoplastic container having an end panel in a plane substantially perpendicular to the body portion, and heat sealed joints effected through only two layers of material.

Other objects will appear hereinafter.

For the purpose of illustrating the invention there is shown in the drawing forms which are presently preferred; it being understood, however, that this invention is not limited to the precise arrangements and instrumentalities shown.

FIGURE 1 is a perspective view of a package in accordance with one embodiment of the present invention.

FIGURE 2 is a perspective view of a package in accordance with a second embodiment of the present invention.

FIGURE 3 is a perspective view of a package in accordance with a third embodiment of the present invention.

FIGURE 4 is a perspective view of a package in accordance with a fourth embodiment of the present invention.

FIGURE 5 is a sectional view along 5—5 in FIGURE 4.

Referring to the drawing in detail, wherein like numerals indicate like elements, there is shown in FIGURE 1 a package designated generally as 10. The package 10 includes an object 12 provided with an external wrapping. The object 12 may be any one of a wide variety of articles such as a box of cigars or the like.

The external wrapping for the object 12 in FIGURE 1 is designated as 14 and is in the nature of a seamless tube of heat sealable polymeric material such as polyethylene, polypropylene, etc. The material 14 may be extremely thin or flimsy such as .5 mil thickness material. Commercially, such material is generally transparent and may be more effectively taken advantage of by means of the present invention since only one layer of the material will be juxtaposed to any surface on the object 12. Heretofore, packaging arrangements resulted in three or more layers of the packaging material being juxtaposed to an end face of the object thereby detracting from the transparency of the material.

The package 10 includes sides 16, 18, 20 and 22. An end panel 24 is integral with the side 16 and separated therefrom by the fold line 26. The fold line 26 constitutes an edge of the end panel 24. Panel 24 is provided with an edge 28 which is joined to the side 18 by a thermofused joint.

The panel 24 is provided with an edge 30 which is joined to the side 22 with a thermofused joint. The panel 24 is provided with an edge 32 joined to the side 20 by a thermofused joint. The thermofused joints are preferably all made simultaneously and are C shaped as illustrated in FIGURE 1. Preferably, the joints will be made from a material which is impervious to water thereby enabling the joints to be waterproof. It will be noted that the joints are formed only at the edges of the panel 24 which is coextensive with the end face of the object 12. Hence, all of the the mofused joints are formed in the plane of the end panel 24 and at the intersection of that plane and the planes of the sides 18, 20 and 22.

The package 10 is formed while the object 12 is disposed within the seamless tube of packaging material. Hence, the object 12 will have little or no relative movement with respect to its container. Since every thermofused joint is formed from only two layers of material, the package is neat, has one layer of the packaging material juxtaposed to each face of the object, may be readily and economically accomplished, and facilitates reading any instructions on the end face of the object 12 when the material 14 is transparent.

In FIGURE 2, there is illustrated another embodiment of the present invention designated generally as 10'. The package 10' is identical with the package 10 except as will be made clear hereinafter. Accordingly, corresponding structure is provided with corresponding primed numerals.

In the package 10', the end panel is in two parts, namely 34 and 36. End panel 34 is integral with side 16' and separated therefrom along the fold line 26'. End panel 36 is integral with the side 22' and separated therefrom by the fold line 38. The thermofused joints effected at the edges 28' and 32' are interconnected intermediate their ends by a thermofused joint 40. Hence, the thermofused joint in FIGURE 1 is C shaped whereas the thermofused joint in FIGURE 2 is H shaped.

In FIGURE 3, there is illustrated another embodiment of the present invention designated generally as 42. Package 42 is identical with package 10' except as will be made clear hereinafter. In forming package 10' the material 14 was in the nature of a tube. Package 42 is particularly useful when the polymeric material is in the nature of two separate sheets. Each of the sheets will be joined to each other along the thermofused joints 44 and 46 which are coextensive with the thermofused joint 40.

In FIGURE 4, there is illustrated another embodiment of the present invention designated generally as 50. Package 50 is identical with package 10 except as will be made clear hereinafter. Whereas package 10 was formed from polymeric material in the nature of a tube, package 50 may be formed from polymeric material in the nature of a single sheet on two sheets superimposed on one another as illustrated. The free edges of the sheets will be joined together along the thermofused joint 54 which is coextensive with a corner of the object disposed therein. If desired, each of the above embodiments could be attained with double thickness material with air or insulating material between the layers.

Hence, it will be seen that I have provided a variety of packages having objects disposed within containers. The containers may be sealed at one or both ends. When sealed at both ends, a means will be provided to facilitate the opening of the same. The containers of the present invention facilitate packaging objects which are waterproof, neat, light in weight, transparent, etc. When double thickness material is used, a strong, lightweight, insulated container is attained.

The present invention may be embodied in other specific forms without departing from the spirit or essential attributes thereof and, accordingly, reference should be made to the appended claims, rather than to the foregoing specification as indicating the scope of the invention.

I claim:

1. A container comprising a body of heat sealable polymeric material, said material being a single sheet which is waterproof and transparent, said container being closed at one end by an end panel integral with one side of said body, said end panel lying in a plane substantially perpendicular to the remainder of said container, edges of said end panel being connected to sides of said body by spaced parallel thermofused joints lying in the plane of said end panel and at the intersection of said plane with the plane of sides of said body and the thickness of said end panel being the same as the thickness of said body.

2. A container in accordance with claim 1 wherein the thermofused joints between the sides of said body and said end panel are C-shaped.

3. A container in accordance with claim 1 wherein the thermofused joints joining said end panel to said container sides are H shaped.

4. A container in accordance with claim 1 wherein said body is provided with a longitudinally extending thermofused joint which intersects one of the joints between sides of said body and said end panel.

5. A container comprising a body of heat sealable polymeric material, said material being at least two separate superimposed sheets which are waterproof and transparent, said container being closed at one end by an end panel integral with one side of said body, said end panel lying in a plane substantially perpendicular to the remainder of said container, edges of said end panel being connected to sides of said body by spaced parallel thermofused joints lying in the plane of said end panel and at the intersection of said plane with the plane of sides of said body, and the thickness of said panel being the same as the thickness of said body.

6. A container comprising a body of heat sealable polymeric material, said material being waterproof and transparent, said container being closed at one end by an end panel integral with one side of said body, said end panel lying in a plane substantially perpendicular to the remainder of said container, edges of said end panel being connected to sides of said body by spaced parallel thermofused joints lying in the plane of said end panel and at the intersection of said plane with the plane of sides of said body, and the thickness of said panel being the same as the thickness of said body.

References Cited by the Examiner
UNITED STATES PATENTS

| | | | |
|---|---|---|---|
| 1,358,875 | 11/1920 | Reynolds | 229—48 |
| 2,082,323 | 6/1937 | Bussey | 229—48 |
| 2,176,584 | 10/1939 | Daller | 229—48 |
| 2,186,973 | 1/1940 | Hothersall | 229—48 |
| 2,282,258 | 5/1942 | Snyder | 229—48 |
| 2,370,226 | 2/1945 | Brede et al. | 229—48 |
| 2,704,179 | 3/1955 | Wilcox | 229—48 |
| 2,789,745 | 4/1957 | Negoro | 229—48 |
| 2,800,163 | 7/1957 | Rusch | 229—45 |
| 2,937,744 | 5/1960 | Olson | 206—45.33 |
| 3,010,639 | 11/1961 | Govatsos | 229—48 |
| 3,070,277 | 12/1962 | Moore | 229—37 |
| 3,107,837 | 10/1963 | Graser | 229—48 |

THERON E. CONDON, *Primary Examiner.*